United States Patent
Whelan et al.

(10) Patent No.: US 10,467,235 B2
(45) Date of Patent: Nov. 5, 2019

(54) IDENTIFYING CONTEXTUAL RESULTS WITHIN ASSOCIATIVE MEMORIES

(71) Applicant: The Boeing Company, Chicago, IL (US)

(72) Inventors: John Desmond Whelan, Burien, WA (US); Harry Eldridge Stovall, III, Redmond, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/861,369

(22) Filed: Apr. 11, 2013

(65) Prior Publication Data

US 2014/0310312 A1   Oct. 16, 2014

(51) Int. Cl.
  *G06F 16/2458*   (2019.01)
  *G06F 16/33*   (2019.01)
(52) U.S. Cl.
  CPC ...... *G06F 16/2458* (2019.01); *G06F 16/3344* (2019.01)
(58) Field of Classification Search
  None
  See application file for complete search history.

(56) References Cited

U.S. PATENT DOCUMENTS

| | | | |
|---|---|---|---|
| 3,618,027 A * | 11/1971 | Feng | 707/741 |
| 4,144,564 A | 3/1979 | Lamb | |
| 4,149,262 A | 4/1979 | Lamb et al. | |
| 5,014,327 A | 5/1991 | Potter et al. | |
| 7,849,049 B2 | 12/2010 | Langseth et al. | |
| 2007/0011175 A1 * | 1/2007 | Langseth | G06F 17/30563 |
| 2008/0250039 A1 | 10/2008 | Franks et al. | |

(Continued)

FOREIGN PATENT DOCUMENTS

| | | |
|---|---|---|
| CN | 101167093 A | 4/2008 |
| CN | 101535990 A | 9/2009 |
| CN | 102930010 A | 2/2013 |

OTHER PUBLICATIONS

Osmar Zaiane, CMPT 354: Database Systems and Structures Summer 98 [catured Apr. 22, 2015], sfu.ca, http://www.cs.sfu.ca/CourseCentral/354/zaiane/material/notes/contents.html, and various select pages.*

(Continued)

*Primary Examiner* — Jason G Liao
(74) *Attorney, Agent, or Firm* — Yee & Associates, P.C.

(57) ABSTRACT

A system including an associative memory and an input device configured to receive a first query or comparison request. The associative memory is configured to: responsive to receiving the first query or comparison request, locate an entity value having an attribute value matching a term of the first query or comparison request; responsive to locating the entity value, return a first list of results including the entity value; add, as a required search term, at least one of first results from the first list to a second query or comparison request, the second query or comparison request further including all terms of the first query or comparison request; perform the second query or comparison request and, as a result, return a second list of resource references; use the second list to retrieve source data; combine the entity value with the source data to form a combination; and return the combination.

18 Claims, 12 Drawing Sheets

(56) References Cited

U.S. PATENT DOCUMENTS

| | | |
|---|---|---|
| 2009/0083207 A1 | 3/2009 | Aparicio |
| 2011/0307435 A1 | 12/2011 | Overall et al. |
| 2012/0215791 A1 | 8/2012 | Malik et al. |
| 2014/0031312 A1 | 1/2014 | Chatterji et al. |

OTHER PUBLICATIONS

Fogel et al, Oracle(R) Database Administrator's Guide 10g Release May 2, 2006, Oracle Corporation, B14231-02, TOC, Preface, What's New in Oracle Database Adminstreator's Guide, pp. 2-25, 2-27, 4-1, 4-2.*

Ontiveros et al., 2005 Marked Significant Year for Industry-Leading Oracle(R) Database 10g Jan. 16, 2006, Oracle Corporation, http://www.oracle.com/us/corporate/press/016632_EN.*

Dell Latitude D600 2003, Dell Inc, http://www.dell.com/downloads/global/products/latit/en/spec_latit_d600_en.pdf.*

Rosenblum et. al, Knowing Just Enough about Relational Databases [captured on Dec. 5, 2008 from archive.org], dummies.com, https://web.archive.org/web/20081205071125/http://www.dummies.com/how-to/content/knowing-just-enough-about-relational-databases.html.*

The Update Report May 2000, The Airline Suppliers Association, vol. 8 Issue 5, http://www.aviationsuppliers.org/asa/files/cclibraryfiles/filename/000000000220/8-5.pdf.*

Aerotec750, Airbus A380 Assembly and Painting Oct. 1, 2010, youtube, https://www.youtube.com/watch?v=_fmRYQp8V4s.*

Associative Memory I [date unknown, viewed on Mar. 14, 2016], mit.edu, http://video.mit.edu/watch/associative-memory-i-6291/.*

Oracle Data Warehouse Introduction of the Relational Model date unknown [captured on Feb. 10, 2010 by archive.org], Burleson Consulting, https://web.archive.org/web/20100210042241/http://dba-oracle.com/data_warehouse/relational_model.htm.*

Longtin et al., How do I limit the number of rows returned by an Oracle query after ordering Feb. 28, 2013, stackoverflow, https://web.archive.org/web/20130228050708/http://stackoverflow.com/questions/470542/how-do-i-limit-the-number-of-rows-returned-by-an-oracle-query-after-ordering.*

Rainardi, Estimating the Size of Dimension and Fact Tables Feb. 13, 2015, wordpress, https://dwbi1.wordpress.com/2015/02/13/estimating-the-size-of-dimension-and-fact-tables/.*

Literal | Define Literal at Dictionary.com, date unknown [captured on Aug. 17, 2016], dictionary.com, http://www.dictionary.com/browse/literal?s=t.*

Turing, On Computable Numbers, with an Application to the Entscheidungsproblem 1936, Proceedings of the London Mathematical Society, vol. 42, pp. 230-265.*

Teevan et al., The Perfect Search Engine Is Not Enough: A study of Orienteering Behavior in Directed Search Apr. 29, 2004, CHI.*

Lane et al., Oracle Datawarehousing Guide Dec. 3, Oracle Sys, TOC, Introduction, Chapter 1.*

Extended European Search Report, dated Jan. 29, 2015, regarding Application No. EP14158936.6, 8 pages.

"Reasoning by Cognitive Distance on an Associative Memory Base," Intel SaffronTech Technical White Paper, Jul. 2017, pp. 1-36.

"Intel Saffron Cognitive Solutions," Intel SaffronTech Technical White Paper, Aug. 2017, pp. 1-12.

San Francisco Bay ACM, "Cognitive Computing with Associative Memories: Reasoning by Similarity, Dr. Paul Hofmann Jan. 27, 2014," YouTube.com, dated Feb. 11, 2014, 1 page, https://www.youtube.com/watch?v=IOeDeR-IhQE.

State Intellectual Property Office of P.R.C., Notification of First Office Action, Search Report, and English Translation, dated Jun. 12, 2018, regarding Application No. 201410144262.5, 9 pages.

Australian Government Examination Report, dated Jan. 14, 2019, regarding Application No. 2014200878, 4 pages.

European Patent Office Communication Report, dated Oct. 24, 2018, regarding Application No. 14158936.6, 11 pages.

Australian Government Examination Report No. 2, dated Apr. 17, 2019, regarding Application No. 2014200878, 4 pages.

* cited by examiner

| Person |
|---|

| Required | Optional | Exclude |
|---|---|---|
|  | high ranking lieutenant |  |

[Associations] [Save]

Associated Person

| Score | Person | Snipits |
|---|---|---|
| 1.00 | 10571 | *** *Lieutenant* Doe received a *high rank* during the combat protocol simulation training in... ② ←1304 |
|  | 1302→① | Matching Terms: *high, rank, lieutenant, ...* [Details] |
| 0.98 | 15701 | 1306→ Recommendation: I recommend that ③ *Lieutenant* Roe checkride on his next flight, due to great performance... |
|  |  | Matching Terms: *high, rank, lieutenant, ...* ⑤ [Details] 1310 |
| 0.96 | 16041 | On *rank* in file, E Poe named his dog *Lieutenant* Voe... |
|  |  | Matching Terms: *high, rank, lieutenant, ...* [Details] |
|  |  | ④ Out of Context |

IDENTIFYING CONTEXTUAL RESULTS WITHIN ASSOCIATIVE MEMORIES

BACKGROUND INFORMATION

1. Field

The present disclosure relates generally to associative memories and, in particular, a system and method for identifying contextual results within associative memories.

2. Background

An associative memory is a memory organization in which the memory is accessed by content, rather than by an explicit address, as with traditional databases. Additionally, reference clues may be continually associated with memory contents until a desirable match is found. Thus, an associative memory may be both a data storage structure and software allowing the data to be accessed by content. An associative memory is more formally defined below. As used throughout this document, the term "query" includes a query, a comparison request, both of these, and multiple ones of these.

In general, associative memories formulate results to a query by matching attribute values of similar entities. In order to be counted, results will contain an attribute value that directly matches one or more of the terms contained within a query. Nevertheless, the results still can be out of context with regard to the user's original intent. When results are out of context with regard to the user's original intent, information not of interest to the user may be returned, possibly along with information that is of interest to the user.

SUMMARY

The illustrative embodiments provide for a system. The system includes an associative memory comprising a plurality of data and a plurality of associations among the plurality of data. The plurality of data is collected into associated groups. The associative memory is configured to be queried based on at least indirect relationships among the plurality of data. The system also includes an input device, in communication with the associative memory, configured to receive a first query or comparison request. The associative memory is configured to, responsive to receiving the first query or comparison request, locate an entity value having an attribute value matching a term of the first query or comparison request. The associative memory is also configured to, responsive to locating the entity value, return a first list of results including the entity value. The associative memory is also configured to add, as a required search term, at least one of the first results from the first list to a second query or comparison request, the second query or comparison request further including all terms of the first query or comparison request. The associative memory is also configured to perform the second query or comparison request and, as a result, return a second list of resource references. The associative memory is also configured to use the second list to retrieve source data. The associative memory is also configured to combine the entity value with the source data to form a combination. The associative memory is also configured to return the combination.

The illustrative embodiments also provide for a method implemented using an associative memory comprising a plurality of data and a plurality of associations among the plurality of data, wherein the plurality of data is collected into associated groups, wherein the associative memory is configured to be queried based on at least indirect relationships among the plurality of data. The method includes receiving a first query or comparison request. The method also includes, responsive to receiving the first query or comparison request, locating an entity value having an attribute value matching a term of the first query or comparison request. The method also includes, responsive to locating the entity value, returning a first list of results including the entity value. The method also includes adding, as a required search term, at least one of the first results from the first list to a second query or comparison request, the second query or comparison request further including all terms of the first query or comparison request. The method also includes performing the second query or comparison request and, as a result, returning a second list of resource references. The method also includes using the second list to retrieve source data. The method also includes combining the entity value with the source data to form a combination. The method also includes returning the combination.

The illustrative embodiments also provide for a data processing system. The data processing system includes a processor, a bus in communication with the processor, and a memory in communication with the bus. The data processing system also includes an associative memory stored in the memory. The associative memory includes a plurality of data and a plurality of associations among the plurality of data. The plurality of data is collected into associated groups. The associative memory is configured to be queried based on at least indirect relationships among the plurality of data. The memory also stores computer usable program code. The code includes computer usable program code for receiving a first query or comparison request for the associative memory. The code also includes computer usable program code for, responsive to receiving the first query or comparison request, locating an entity value in the associative memory, the entity value having an attribute value matching a term of the first query or comparison request. The code also includes computer usable program code for, responsive to locating the entity value, causing the associative memory return a first list of results including the entity value. The code also includes computer usable program code for adding, as a required search term, at least one of the first results from the first list to a second query or comparison request, the second query or comparison request further including all terms of the first query or comparison request. The code also includes computer usable program code for performing the second query or comparison request in the associative memory and, as a result, returning a second list of resource references. The code also includes computer usable program code for using the second list to retrieve source data. The code also includes computer usable program code for combining the entity value with the source data to form a combination. The code also includes computer usable program code for returning the combination.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 13 is an illustration of matching attribute values, excluding the required entity, as a result of performing the second query described in FIG. 11, demonstrating the actual context of the results, in accordance with an illustrative embodiment;

DETAILED DESCRIPTION

Figure 1:
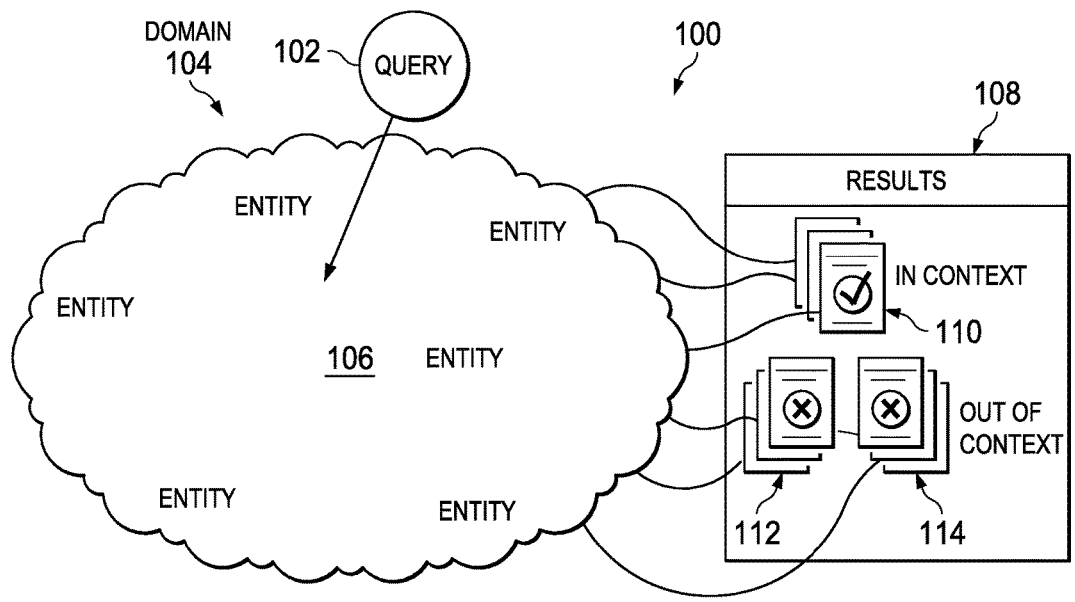
FIG. 1 is a diagram illustrating a process of determining whether results of a search or query of an associative memory are in the same context as originally intended by a user, in accordance with an illustrative embodiment.

The illustrative embodiments provide several useful functions. For example, the illustrative embodiments recognize and take into account that associative memories may formulate results to a query or comparison request by matching attribute values of similar entities. In order to be counted, a result will contain an attribute value that directly matches one or more of the terms contained within a query or comparison request.

Nevertheless, the illustrative embodiments also recognize and take into account that the results still can be out of context with regards to the user's original intent. For example, suppose the results for a query for "high ranking lieutenant" matched on lieutenant The user will not know the context surrounding this match without actually investigating the original source from where the match occurred. For example, the matching attribute value, "lieutenant", could have been within a phrase in the source data such as, "he was not a high ranking lieutenant". The results returned after the query would contain this source data; however, this result would not meet the user's original intent. The illustrative embodiments provide a mechanism for aiding the user to ensure that the returned results are in context and thereby reflect the user's intent.

The illustrative embodiments also recognize and take into account that, unlike traditional searches using Internet search engines or perhaps traditional queries of relational databases, an implied association exists among the results returned by an associative memory. Therefore, understanding the context of the matching query terms in relation to each resulting entity may be considered important. For example, multiple results can form the same entity.

Stated differently, the results of a query of an associative memory may be returned to the user as one or more entities. Unlike traditional search results, the entities themselves may be ambiguous. For example, an entity could be a flight from the city of Seattle, Wash. to the city of Dallas, Tex. The attributes of this entity could be structured or tangible, such as distance or number of passengers. The attributes of this entity could also be unstructured or intangible, such as noisy or bumpy. The attribute values are the terms which need to equal the query terms in order to be considered a match. Obtaining the correct context of results such as these, present many challenges.

The illustrative embodiments also recognize and take into account that, because of this dynamic structure, query terms may have an unclear relationship to the results. For example, suppose an entity result has the search terms "Alpha Beta Gamma". Each term could be in a separate resource, all of which point to the same entity. Consequently, there could be multiple entity results for the same entity comprising these terms. On the other hand, in this example, a single resource itself is very unlikely to contain all three of these search terms. When taken in a separate context, there could be some confusion surrounding each one of these terms. For example, consider the case when "Alpha" and "Beta" are quite common names, but "Gamma" seems to be unique. There may be confusion in the results with respect to "Alpha" and "Beta".

Furthermore, a single resource could contain multiple associated entities. For example, the resource "Company A, Company B, and Company C are high technology companies" contains associations to three entities; namely, companies A, B, and C. When considering the resource's context in the traditional sense, one may only be concerned with resource itself. However, when using associative memories, each entity result is usually taken into consideration as each entity result relates to the context of the resource. In this case, the context is the observation that all three entities are high technology companies.

The illustrative embodiments also recognize and take into account that, in terms of context, identifying the correct resource with its corresponding result may be important to a user. Because the data may be organized by associations and not necessarily by categories, as with traditional searches, an associative memory query's results may be more complicated then they appear to be to some users. The illustrative embodiments provide a solution for addressing this complication by providing the context of a query's results to a user, and/or by returning only in-context results to the user.

As used herein, the term "associative memory" refers to a plurality of data and a plurality of associations among the plurality of data. The plurality of data and the plurality of associations may be stored in a non-transitory computer readable storage medium. The plurality of data may be collected into associated groups. The associative memory may be configured to be queried based on at least indirect relationships among the plurality of data in addition to direct correlations among the plurality of data. Thus, an associative memory may be configured to be queried based solely on direct relationships, based solely on indirect relationships, as well as based on combinations of direct and indirect relationships.

As described above, an associative memory may be characterized as a plurality of data and a plurality of associations among the plurality of data. The plurality of data may be collected into associated groups. Further, the associative memory may be configured to be queried based on at least one relationship, selected from a group that includes direct and indirect relationships, or from among the plurality of data in addition to direct correlations among the plurality of data. An associative memory may also take the form of software. Thus, an associative memory also may be considered a process by which information is collected into associated groups in the interest of gaining new insight based on relationships rather than direct correlation. An associative memory may also take the form of hardware, such as specialized processors or a field programmable gate array.

As used herein, the term "entity" refers to an object that has a distinct, separate existence, though such existence need not be a material existence. Thus, abstractions and legal constructs may be regarded as entities. As used herein, an entity need not be animate.

As used herein, unless specified otherwise, the term "entity comparison" or "comparison request" refers solely to an aspect of an associative memory. An entity comparison or "comparison request" is used to identify similarities between attributes of one or more first entities stored in the associative memory and the attributes of one or more second entities stored in the associative memory.

FIG. 1 is a diagram illustrating a process of determining whether results of a search or query of an associative memory are in the same context as originally intended by a user, in accordance with an illustrative embodiment. Process 100 shown in FIG. 1 may be implemented using an associative memory, such as associative memory 402 of FIG. 4 or associative memory 1528 of FIG. 15.

As indicated above, the illustrative embodiments provide a user the ability to determine if the results of a query to an associative memory are in the same context as the user's original intent. In the overview example shown in FIG. 1, query 102 is made of an associative memory in domain 104, which includes entities 106.

The associative memory may return results 108. In an illustrative embodiment, the associative memory may cause to be displayed to the user both in-context results 110, out-of-context results 112, and out-of-context results 114. In another illustrative embodiment, the associative memory may cause only in-context results 110 to be displayed to the user. In still another illustrative embodiment, some of the results of either type may be displayed in any combination. In yet another illustrative embodiment, only out-of-context results may be displayed.

Figure 2:
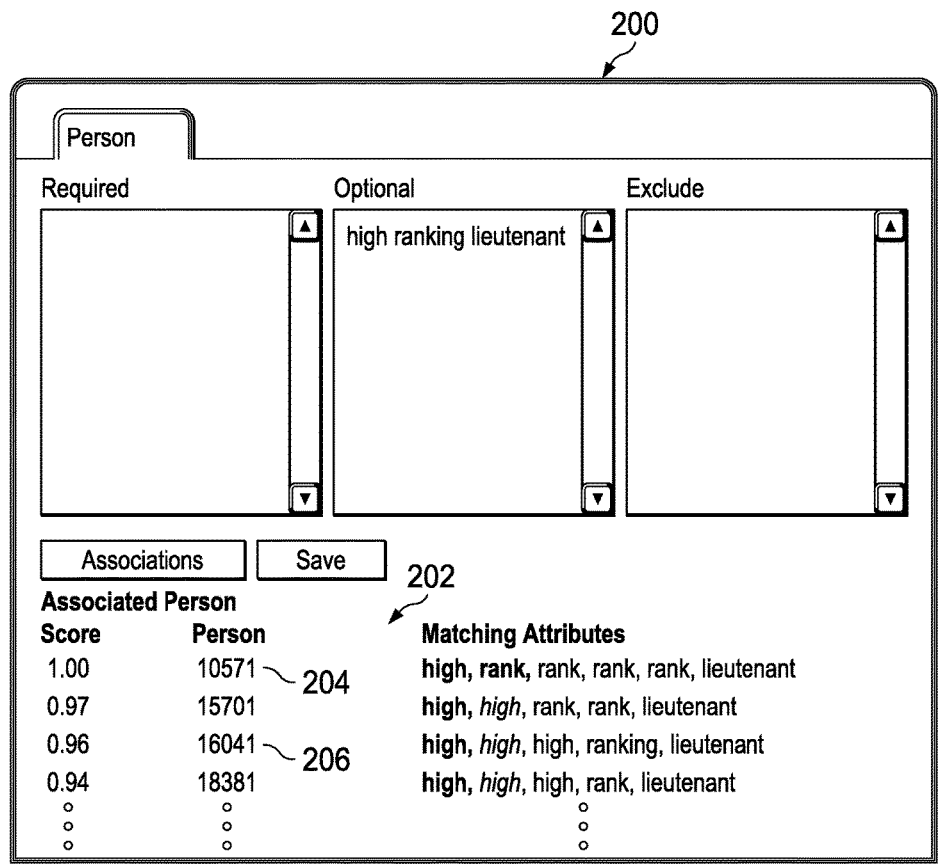
FIG. 2 is a diagram illustrating results of a search or query of an associative memory lacking any context, in accordance with an illustrative embodiment.

FIG. 2 is a diagram illustrating results of a search or query of an associative memory lacking any context, in accordance with an illustrative embodiment. Query 200 may be an example of query 102 of FIG. 1. Results 202 may be an example of results 108 of FIG. 1. Some of results 202 may be out of context, such as out-of-context results 112 and out-of-context results 114.

As mentioned above, associative memories may formulate their results by matching attribute values of similar entities. In order to be counted a result will contain an attribute value that directly matches one or more of the terms contained within the query.

Nevertheless, the results still can be out of context with regard to the user's original intent. For example, suppose the results for query 200, for "High Ranking Lieutenant", matched on "lieutenant". There exists no way to know the context surrounding this match without actually investigating the original source from where the match occurred. Thus, knowing the context surrounding a match is difficult because the relationship between resources and their corresponding entity results is difficult to ascertain without the time consuming action of investigating the original source. For example, perhaps the matching attribute value, "lieutenant," was within a phrase like, "he was not a high ranking lieutenant". In this case, the returned result would not meet the user's original intent. Moreover, investigating the original source within an associated memory can be difficult because of the relationship of the associative memory with the resulting entities.

Furthermore, the user does not know which results are in context and which results are out of context without providing some sort of distinction. For example, result 204 may be in context and result 206 may be out of context, but the user would not know the difference until the user investigated the original source data corresponding to a given result. This situation may be considered undesirable to a user at some times.

One of the problems is, unlike traditional searches where the results of the search have no implied association with each other, a search using an associative memory can and typically does generate results which actually relate to each other. Another problem is that multiple results can be of the same entity. This issue is described with respect to FIG. 3.

Figure 3:
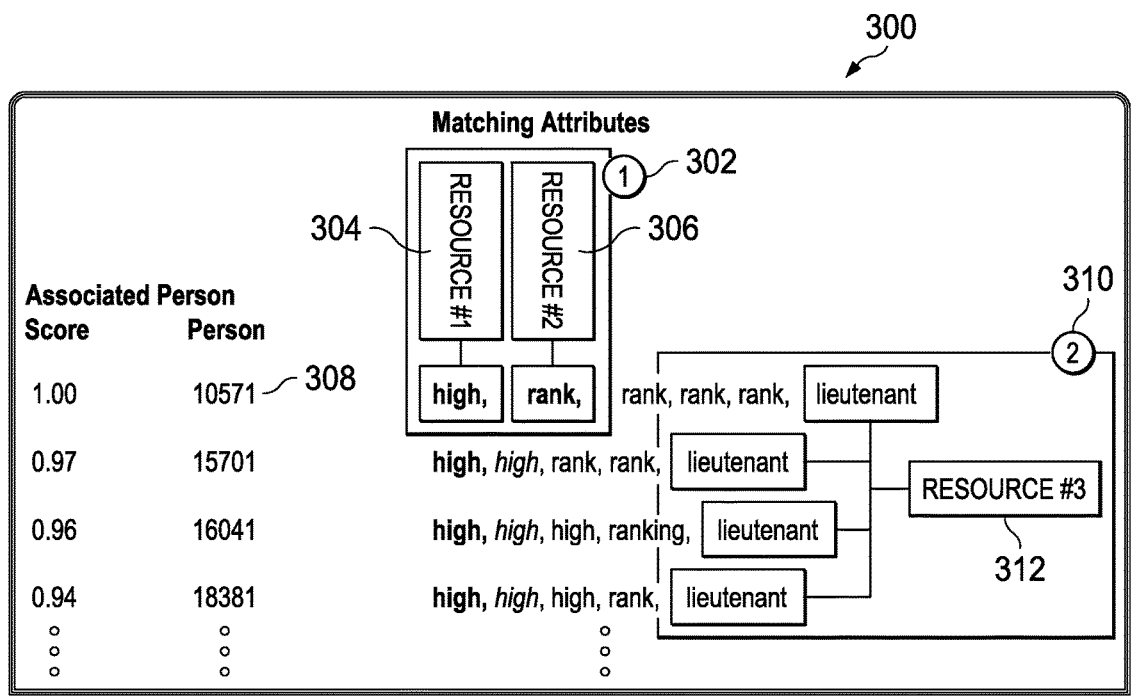
FIG. 3 is a diagram illustrating results of a search or query of an associative memory, where the results are from multiple resources and where multiple entities share the same result, in accordance with an illustrative embodiment.

FIG. 3 is a diagram illustrating results of a search or query of an associative memory, where the results are from multiple resources and where multiple entities share the same result, in accordance with an illustrative embodiment. Results 300 may be results 200 from FIG. 2. Thus, FIG. 3 shows additional details of FIG. 2.

With respect to both FIG. 2 and FIG. 3, because the results are returned as entities, the results tend to have an ambiguous connection to the original query terms. What complicates this relationship even further is the dynamic structure of the entity in the results.

The structure of an entity stems from a resource which provides an extra layer not usually found in traditional searches. As a result, matches can occur in multiple places, among multiple resources, all of which correspond to one entity result. This first feature is shown in box "1" 302, which shows that resource #1 304 and resource #2 306 contain matches to the search terms for a single entity, entity 308.

In addition, multiple entity results can share a single resource containing the same desired query term or terms.

This second feature is shown in box "2" 310, which shows that the term "lieutenant" is in each of the returned entity results, and that the term "lieutenant" is from resource #3 312.

The presence of either or both of the first feature and the second feature described above can create a sense of confusion in a user, especially regarding the particular context of a specific result. Thus, prior to the illustrative embodiments described herein, regardless of the query, no way existed to guarantee the results would always pertain to the user's intent. This issue is particularly problematic with associative memories, because the data is organized by associations and not necessarily by categories, as with traditional databases.

Currently, to address this issue, associative memories may use perspectives as a method for distinguishing one context from another. A perspective provides a "point of view" or a context for a particular aspect of a user's domain. Typically, an associative memory is logically divided into perspectives. For example, "parts" could be a perspective within a commercial aircraft domain. Using perspectives to divide the associative memory may make the corresponding queries independent of each other.

However, this approach has limitations when attempting to provide context to an associative memory query. For example, this approach does not provide any help within a single perspective itself. Additionally, the issues described with respect to FIG. 2 and FIG. 3 may still arise when a perspective is used as part of a query. Thus, while use of a perspective during a query may mitigate the contextual issues described above, in some cases use of a perspective may be of no help or may be of only limited help.

Figure 4:
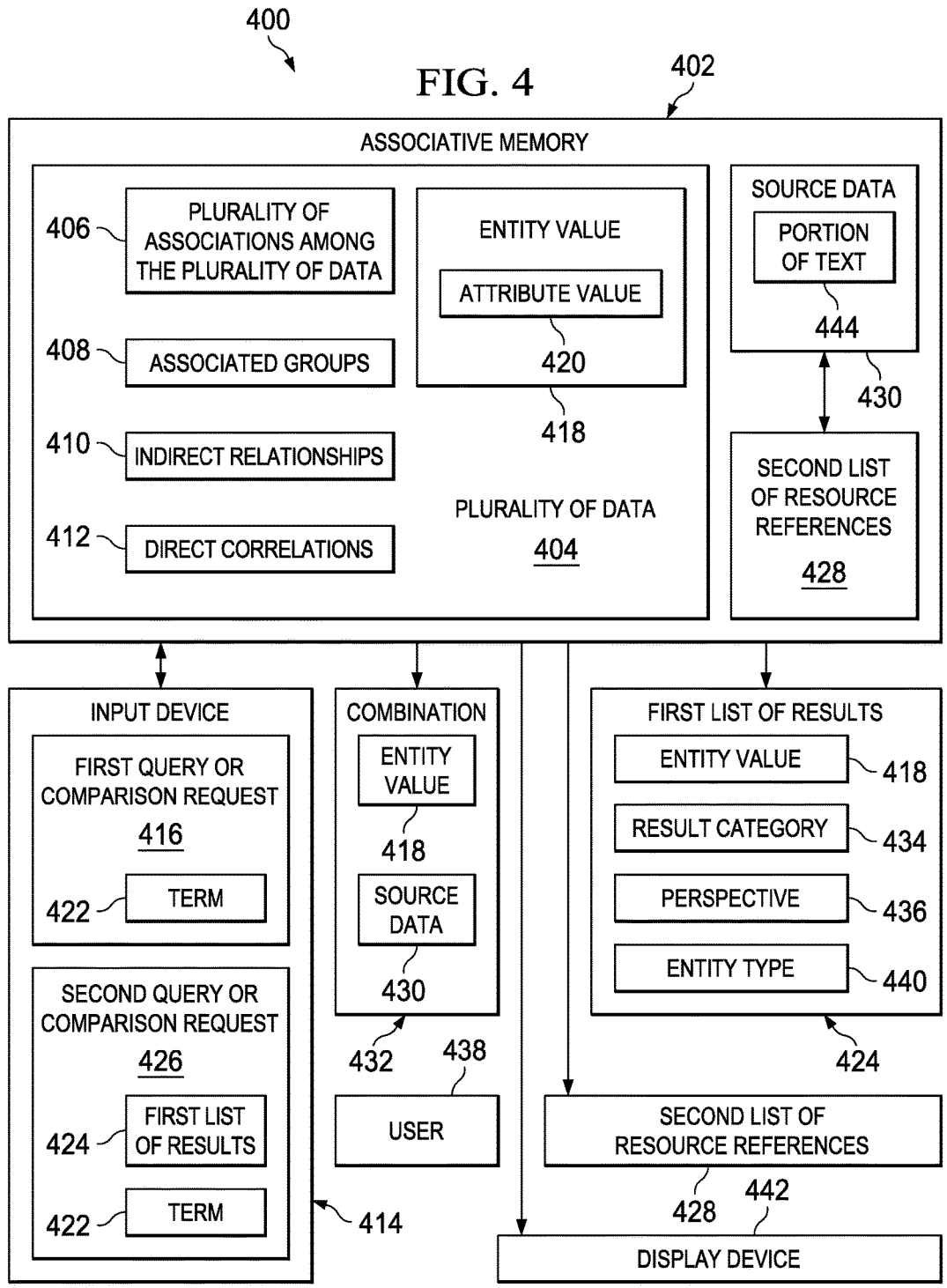
FIG. 4 is a block diagram illustrating a system for determining whether results of a search or query of an associative memory are in the same context as originally intended by a user, in accordance with an illustrative embodiment.

FIG. 4 is a block diagram illustrating a system for determining whether results of a search or query of an associative memory are in the same context as originally intended by a user, in accordance with an illustrative embodiment. System 400 may be used to address the issues described above. Specifically, system 400 may be used to identify and potentially to present information to a user that allows the user to evaluate whether results returned from a query to an associative memory are in context.

Stated differently, the illustrative embodiments allow a user to differentiate results of an associative memory query and determine which result best pertains to their original intent. Thus, the illustrative embodiments allow a user to obtain query results that provide the best insight, and also to ignore those results that the user considers to be out of context.

The illustrative embodiments allow a user to focus on contextual results. The illustrative embodiments may provide more information, so users can make informed decisions more quickly. The illustrative embodiments may cause the display of the original source data as the source data pertains to the criteria entered by the user. The illustrative embodiments may return results that are ordered by relevance, so that the most important information is displayed first. The illustrative embodiments may differentiate database manipulations by revealing original source content at the time of the query. The illustrative embodiments may be subject matter independent and universally deployable.

Specifically, the illustrative embodiments provide for system 400. System 400 may include associative memory 402. Associative memory 402 may include plurality of data 404 and plurality of associations among the plurality of data 406. Plurality of data 404 may be collected into associated groups 408.

Associative memory 402 may be configured to be queried based on at least indirect relationships 410 among the plurality of data. Associative memory 402 also may be configured to be queried based on direct correlations 412.

System 400 also may include input device 414, which may be in communication with associative memory 402. Input device 414 may be configured to receive first query or comparison request 416. Associative memory 402 may be configured to, responsive to receiving first query or comparison request 416, locate entity value 418 having attribute value 420 matching term 422 of first query or comparison request 416. Associative memory 402 also may be configured, responsive to locating entity value 418, to return first list of results 424 including entity value 418.

Associative memory 402 also may be configured to add, as a required search term, at least one of the first results from first list of results 424 to second query or comparison request 426. Second query or comparison request 426 further may include all terms of first query or comparison request 416, such as term 422. Associative memory also may be configured to perform second query or comparison request 426 and, as a result, return second list of resource references 428.

Associative memory 402 also may be configured to use second list of resource references 428 to retrieve source data 430. Associative memory 402 also may be configured to combine entity value 418 with source data 430 to form combination 432. Associative memory 402 also may be configured to return combination 432.

In an illustrative embodiment, associative memory 402 may initiate second query or comparison request 426 in response to input device 414 receiving first query or comparison request 416. In another illustrative embodiment, first list of results 424 may have a result category 434 equaling a perspective 436 of first query and the comparison request 416.

In another illustrative embodiment, associative memory 402 may be further configured to avoid presenting first list of results 424 to user 438. In yet another illustrative embodiment, associative memory 402 may be further configured to require a match on entity value 418.

In still another illustrative embodiment, associative memory 402 may be configured to return second list of resource references 428 instead of returning entity type 440 or perspective 436 as result category 434. In an illustrative embodiment source data 430 may be from an original source of data. In this case, associative memory 402 may be further configured to avoid presenting source data 430 to user 438.

In another illustrative embodiment, system 400 may also include display device 442 in communication with associative memory 402. In this case, associative memory 402 may be further configured to cause display device 442 to display combination 432.

In an another illustrative embodiment, associative memory 402 may be further configured to cause display device 442 to further display attribute value 420 that matches term 422 of first query or comparison request 416. In this case, associative memory 402 may be further configured to display portion of text 444 from source data 430. However, in an illustrative embodiment, associative memory 402 may be further configured to cause entity value 418 to be excluded from display.

The illustrative embodiments shown in FIG. 4 are not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

Figure 5:
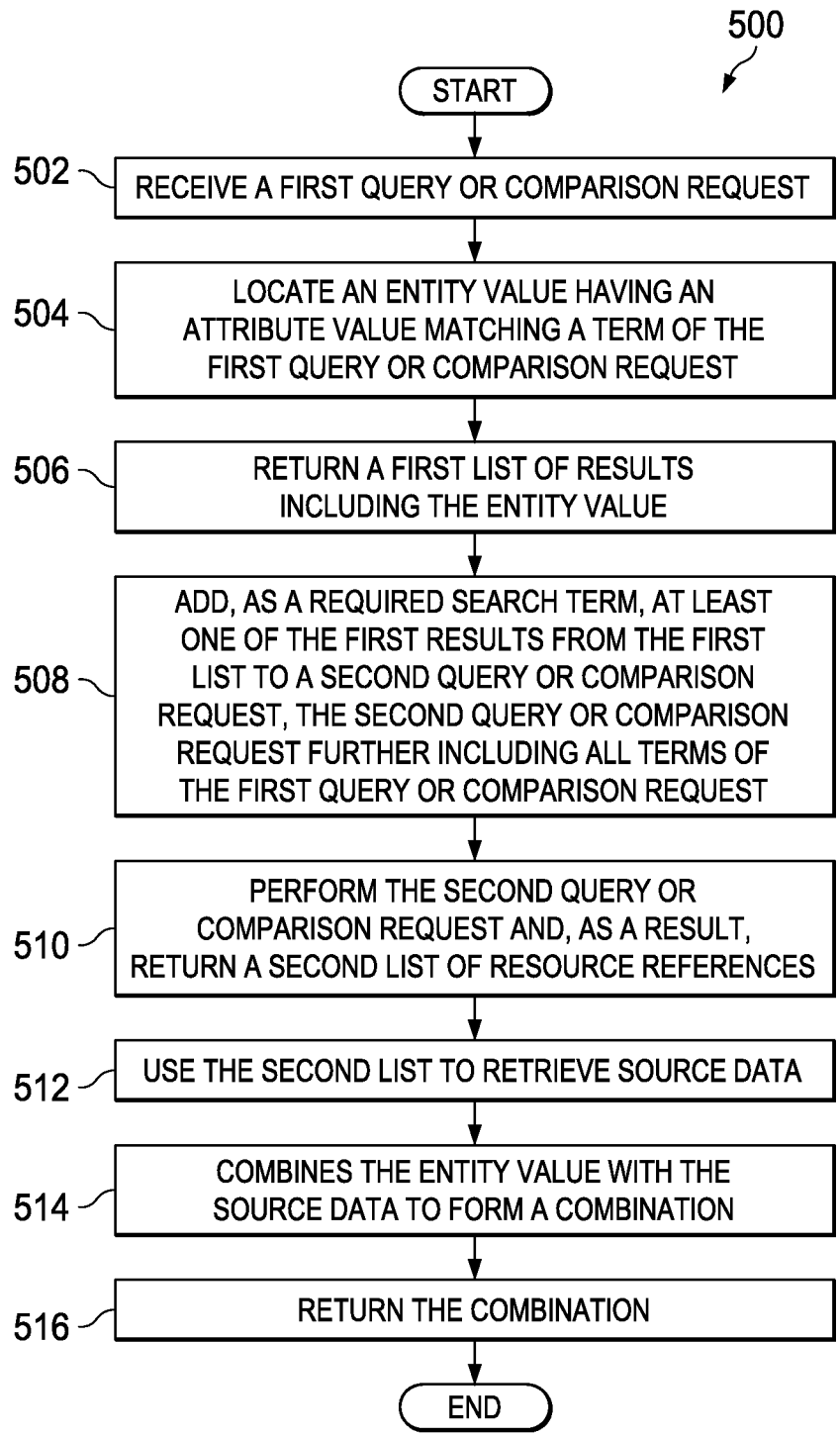
FIG. 5 is a flowchart illustrating a process for determining whether results of a search or query of an associative memory are in the same context as originally intended by a user, in accordance with an illustrative embodiment.

FIG. 5 is a flowchart illustrating a process for determining whether results of a search or query of an associative memory are in the same context as originally intended by a user, in accordance with an illustrative embodiment. Process 500 may be implemented by system 400 of FIG. 4 or data processing system 1500 of FIG. 15. With respect to FIG. 5, a "process" is described as performing an action. As used herein, a "process" is considered to be a non-transitory processor or other physical device configured to perform the action described, or may be considered to be a non-transitory computer readable storage medium storing computer usable program code configured, when executed, to carry out the action described.

Process 500 may be implemented using an associative memory comprising a plurality of data and a plurality of associations among the plurality of data, wherein the plurality of data is collected into associated groups, wherein the associative memory is configured to be queried based on at least indirect relationships among the plurality of data. The method may begin as the process receives a first query or comparison request (operation 502). Responsive to receiving the first query or comparison request, the process may locate an entity value having an attribute value matching a term of the first query or comparison request (operation 504).

Responsive to locating the entity value, the process may return a first list of results including the entity value (operation 506). The process may add, as a required search term, at least one of the first results from the first list to a second query or comparison request, the second query or comparison request further including all terms of the first query or comparison request (operation 508).

The process may perform the second query or comparison request and, as a result, return a second list of resource references (operation 510). The process may use the second list to retrieve source data (operation 512). The process may combine the entity value with the source data to form a combination (operation 514). The process may return the combination (operation 516). The process may terminate thereafter.

This process may be varied. For example, the first list of results may have a result category equaling a perspective of the at least one of the query and the comparison request. In another example the process may also display the combination on a display, while avoiding presentation of the first list to a user. In another example the process may return the second list instead of returning an entity type or perspective as a result category. In still another example, the process may display, on a display, the combination, the attribute value that matches the term of the first query or comparison request, and a portion of text from the source data.

Figure 6:
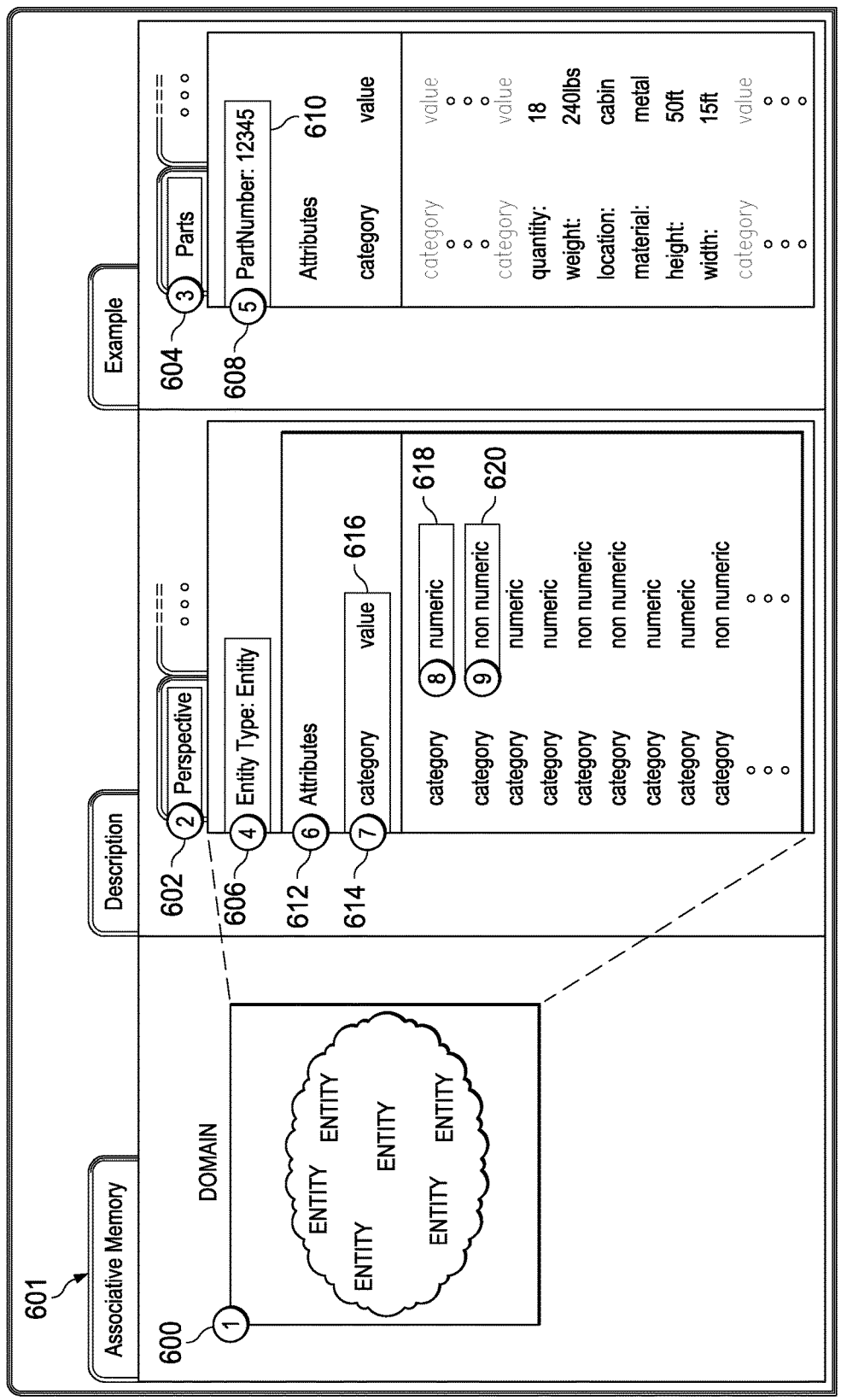
FIG. 6 is an illustration of perspectives, entities, and attributes within an associative memory, in accordance with an illustrative embodiment.

FIG. 6 is an illustration of perspectives, entities, and attributes within an associative memory, in accordance with an illustrative embodiment. FIG. 6 shows more detail of perspectives and entities relative to domain 104 of FIG. 1. The illustrative embodiments use information collected from an associative memory. Associative memory 601 may be associative memory 402 of FIG. 4 or associative memory 1528 of FIG. 15. Associative memory 601 may include cloud of information 600 (circle 1) shown in FIG. 6.

Typically, a user may logically divide associative memory 601 into perspectives, such as perspective 602 (circle 2). A perspective provides a point of view or an initial context for a particular aspect of a user's domain. For example, parts 604 (circle 3) could be a perspective within a commercial aircraft domain.

Associative memory 601 may organize data into entities. An entity is an instantiation of an entity type, such as entity type 606 (circle 4). For example, an entity type could be a part number, such as "part number" 608 (circle 5). In turn, the actual entity would be an instantiation of that entity type, such as actual part number 610.

Furthermore, perspectives usually represent one or more entity types. This feature allows users to view domain data from a perspective that is both beneficial to the user and to the memory.

Each entity may contain a set of attributes, such as set of attributes 612 (circle 6). Set of attributes 612 may be used to describe the corresponding entity; in this case, part number 610. Associative memory 601 may separate each attribute into a category, such as category 614 (circle 7) and its corresponding value, such as corresponding value 616. An attribute value can be either numeric, such as attribute value 618 (circle 8) or non-numeric, such as attribute value 620 (circle 9). The associative memory may use these attribute categories and values when performing entity comparisons and queries.

Figure 7:
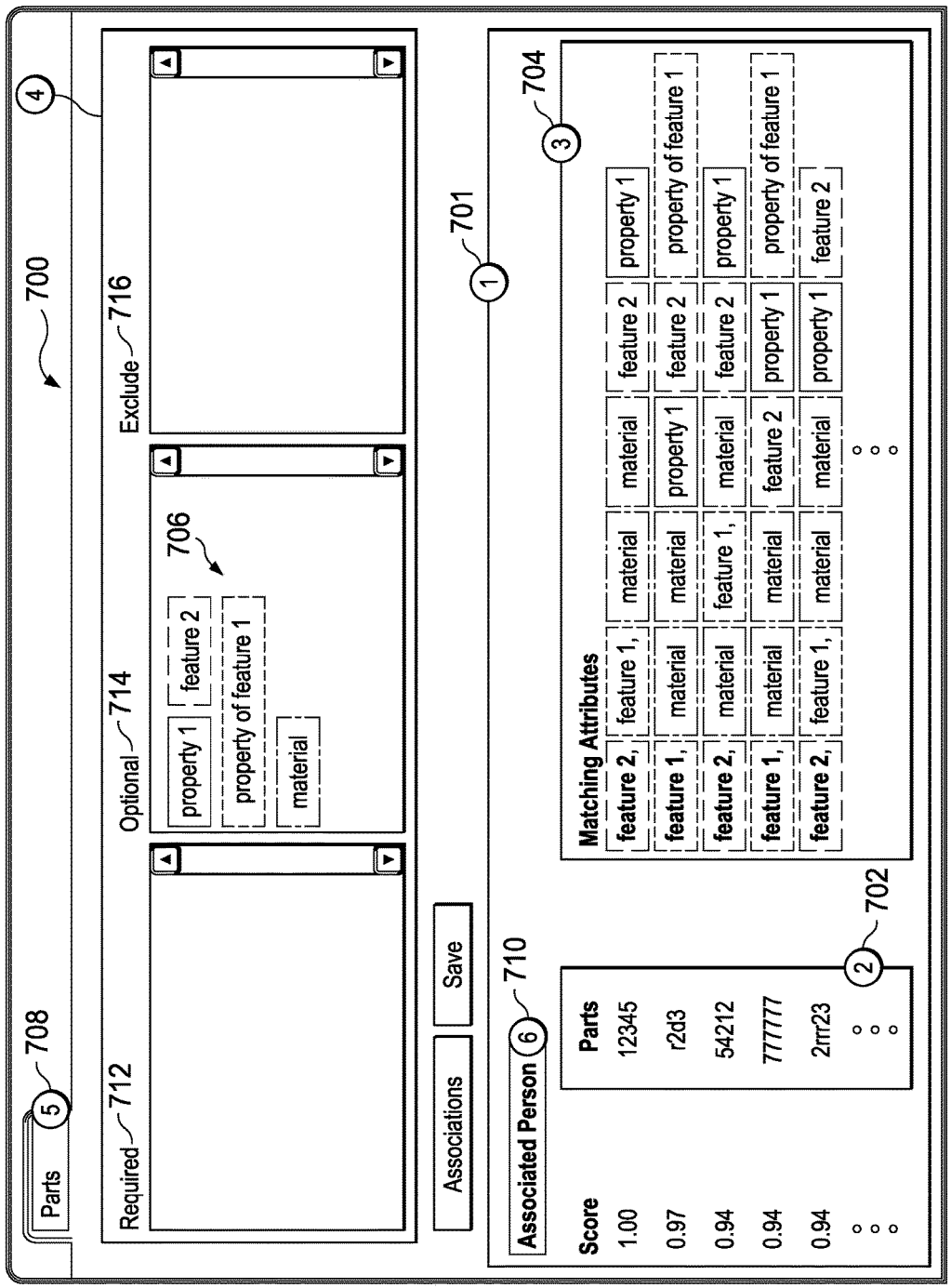
FIG. 7 is an illustration of an associative memory query, in accordance with an illustrative embodiment.

FIG. 7 is an illustration of an associative memory query, in accordance with an illustrative embodiment. Query 700 is made of an associative memory, such as associative memory 402 of FIG. 4 or associative memory 1528 of FIG. 15. FIG. 7 in particular may refer to associative memory 601 of FIG. 6.

Results 701 (circle 1) of an associative memory query is composed of entities 702 (circle 2). Attribute values 704 (circle 3), associated with entities 702, match query terms 706 (circle 4) provided by the user. In the case of an entity comparison, the associative memory itself may provide the query terms. Each query takes place in a perspective, such as perspective 708 (circle 5). Perspective 708 matches the entity type sought, in this case entity type 710 (circle 6). Entity type 710 in this case may have a value of "associated parts".

Query terms 706 may be "required" 712, "optional" 714 or "exclude" 716. In the illustrative embodiments shown, all query terms are optional, though this example is not necessarily limiting of the illustrative embodiments. The entries in "required" 712 form a logical conjunction (AND). The entries in "optional" 714 form a logical disjunction (OR). The entries in "exclude" form a logical negation (NOT). In addition, within each entry, logical expressions can be used as well. The default logical expression is "OR". For example, in the illustrative embodiment shown, the four terms are considered separated by a logical "OR". A user could have explicitly designated connectors between the shown terms as being "AND", "NOT", or a combination of any of "AND", "NOT", or "OR". The associative memory will use the final query to complete entity comparisons within the associative memory and searches of the associative memory.

Figure 8:
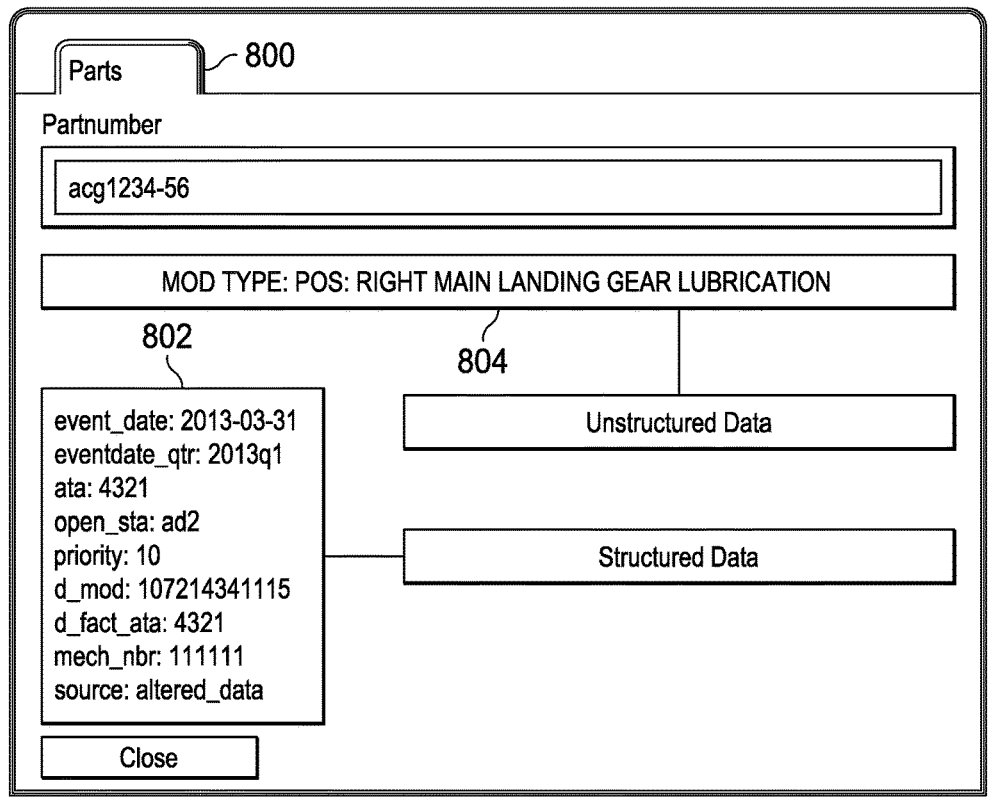
FIG. 8 is an illustration of a resource in an associative memory, in accordance with an illustrative embodiment.

FIG. 8 is an illustration of a resource in an associative memory, in accordance with an illustrative embodiment. Resource 800 may be a resource in an associative memory, such as associative memory 402 of FIG. 4, associative memory 1528 of FIG. 15, or associative memory 601 of FIG. 6. Resource 800 may be a group of data put together by a common identifier.

In an illustrative embodiment, the source data which makes up an associative memory may reside in a traditional database or in a different file. The source data may be separate from the associative memory to ensure integrity of the source data and to preserve the context of the source data. As a result, the associative memory may, in some cases, only maintain a reference pointer back to each individual record of data. This pointer may be called a resource reference. A resource may be a virtual collection of this data.

The source data to which an associative memory refers may offer two forms, structured or unstructured. For structured data, such as structured data 802, the structure defines the data. Column names and eXtensible Markup Language (XML) tags are good examples of structured data.

Unstructured data, such as unstructured data 804, is free text without predefined structure. The associative memory may make use of external parsers and extractors help define a structure for unstructured data.

The unstructured data within a resource usually provides the best context. The unstructured data may display sentences in a vernacular that a subject matter expert or other user can easily interpret. However, traditional software has no way of interpreting the meaning behind words used in unstructured text. Therefore, much of the context may be lost.

Figure 9:
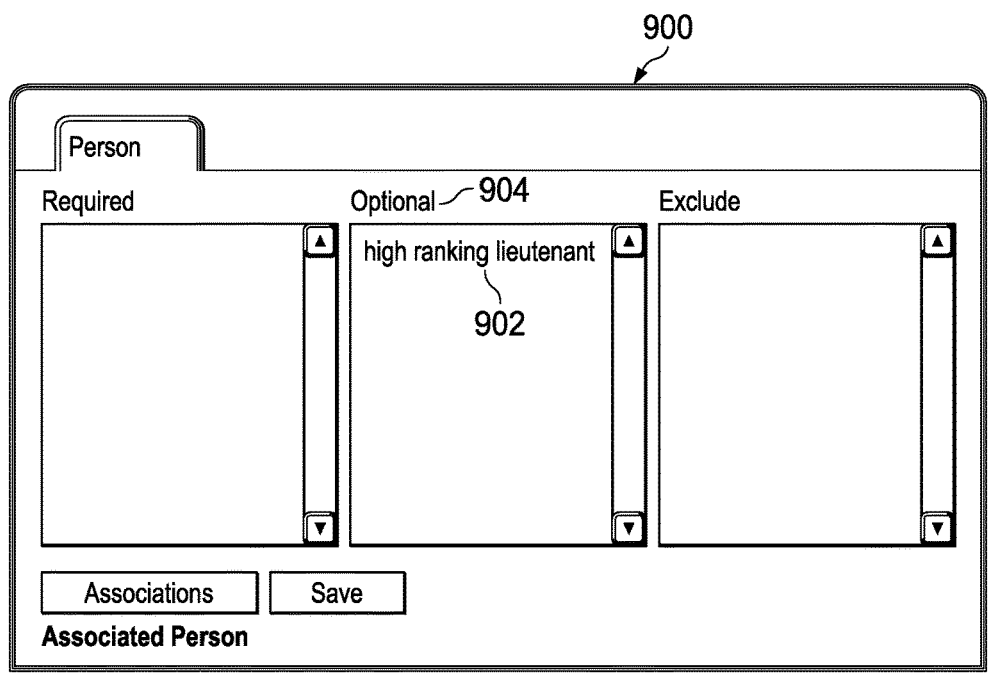
FIG. 9 is an illustration of using query terms in an associative memory query, in accordance with an illustrative embodiment.

FIG. 9 is an illustration of using query terms in an associative memory query, in accordance with an illustrative embodiment. The associative memory may be associative memory 402 in FIG. 4 or associative memory 1528 in FIG. 15, or some other associative memory. Query entry form 900 may be used as part of the process for the illustrative embodiments. FIG. 9 may show first and second steps to a method of the illustrative embodiments. This method may be implemented by an associative memory or may be embodied as computer instructions stored on a non-transitory computer readable storage medium.

Because the results of an associative memory query may incorporate a vast amount of information, distinguishing which information is actually pertinent may be difficult. In order to determine if the results of a query of an associative memory are in the correct context, a user would have to investigate each individual result to see if the matching attribute values collected by the associative memory actually pertain to the user's intent. These values could be distributed among countless resources in original source data. Thus, the task of determining whether the results of the query are in context may be difficult and time-consuming and, in some cases, impractical. The illustrative embodiments address this issue.

First, the illustrative embodiments allow the user or the associative memory, or both, to enter query terms as shown in query terms form 900. Query terms form 900 may be the same as the form used for perspective 708 in FIG. 7. Query terms automatically provided by the associative memory are most often received when performing an entity comparison. Continuing the example in FIG. 1 and FIG. 2, search term 902 is "high ranking lieutenant" entered into "optional" entry 904. Thus, a first step to the illustrative embodiments may be to provide a mechanism for receiving a query in the associative memory. Such a mechanism is shown in FIG. 9.

Second, the user may initiate the query, causing the associative memory to locate entities with attribute values that match the terms entered. In the case of a comparison, the associative memory may automatically initiate the query. Thus, a second step to the illustrative embodiments may be to receive a query in the associative memory.

Figure 10:
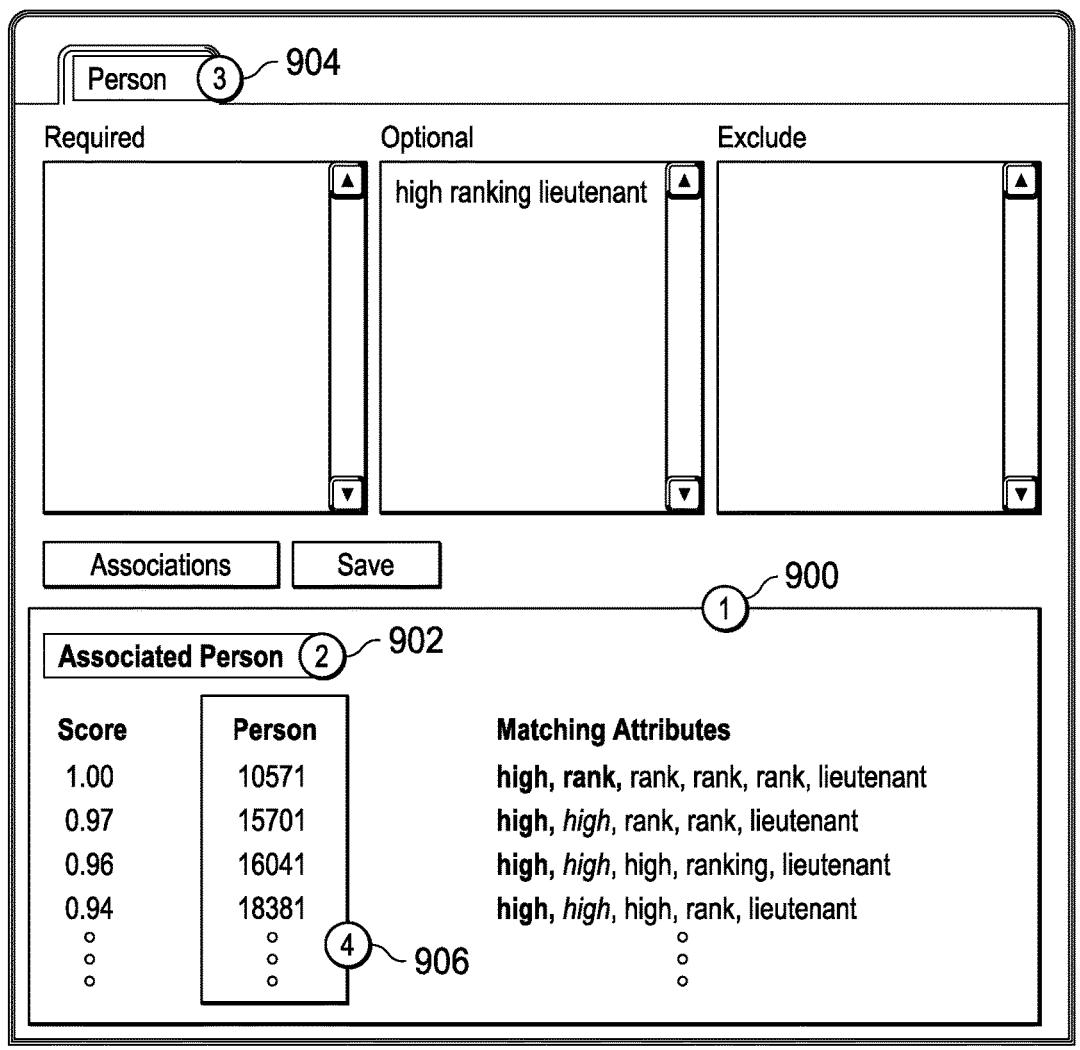
FIG. 10 is an illustration of entities resulting from an associative memory query, in accordance with an illustrative embodiment.

FIG. 10 is an illustration of entities resulting from an associative memory query, in accordance with an illustrative embodiment. FIG. 10 may represent a third step in a method of the illustrative embodiments. Thus, FIG. 10 is a continuation of the examples that began in FIG. 1, FIG. 2, and FIG. 9.

Specifically, a third step in an illustrative embodiment may be to return an initial list of results, such as query terms form 900 (circle "1") with search term 902 (circle "2") equaling perspective 904 (circle "3"). Search term 902 may also equal an entity type. For example, a query on "person" would return a list of persons. The user need not see these results, as the illustrative embodiments only uses the list of entities values 906 (circle "4") returned. The associative memory may collect these values internally for the next query in the following step shown in FIG. 11.

Figure 11:
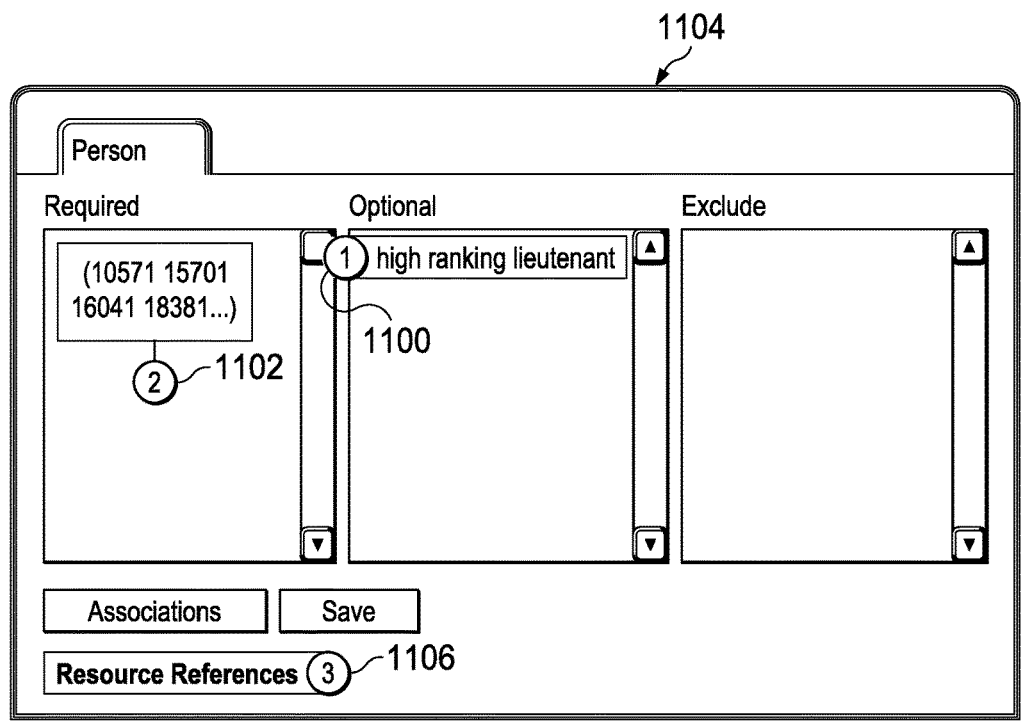
FIG. 11 is an illustration of re-entering the results into the original query to perform a second query to retrieve the resource references in an associative memory, in accordance with an illustrative embodiment.

FIG. 11 is an illustration of re-entering the results from the original query to perform a second query to retrieve the resource references in an associative memory, in accordance with an illustrative embodiment. FIG. 11 may represent a fourth step in a method of the illustrative embodiments. Thus, FIG. 11 is a continuation of the examples began in FIG. 1, FIG. 2, FIG. 9, and FIG. 10.

In this fourth step, using the results from the last step shown in FIG. 10, the illustrative embodiments instruct the associative memory to perform the same query as in the second step shown in FIG. 9, as shown at search term 902 in FIG. 9 or search term 1100 in FIG. 11, but with an addition. Specifically, the associative memory adds the list of entity values from the results of Step 3, such as the list of entities values 906 of FIG. 9, to required field 1102 (circle "2") of query entry form 1104. The associative memory may designate that a match on one or more of these entity values is required. In an illustrative embodiment, the associative memory may surround the entity values with parentheses to indicate a match on one or more of the entities are required.

Figure 12:
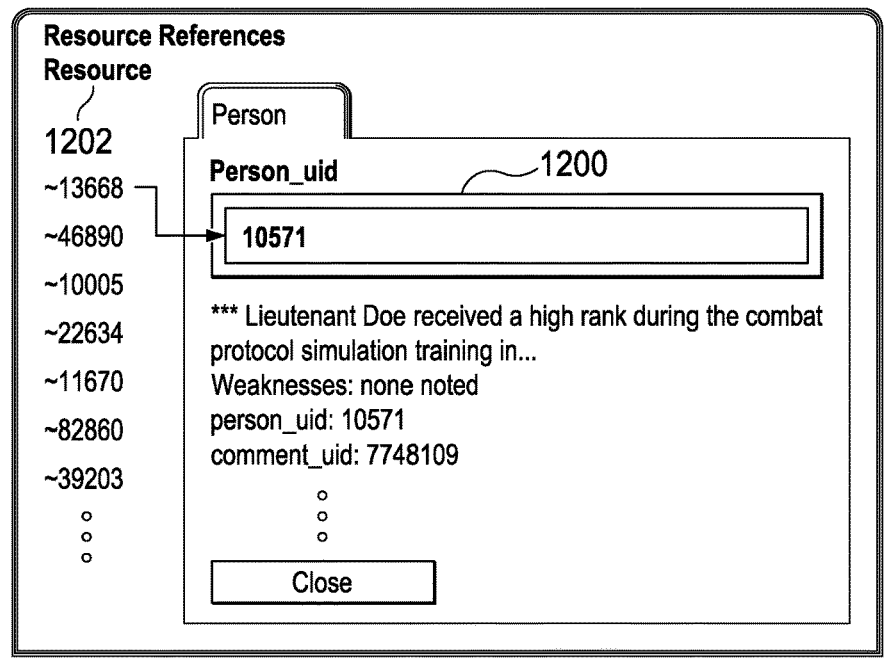
FIG. 12 is an illustration of using the resource references obtained as a result of the second query described in FIG. 11 to retrieve actual data from original sources, in accordance with an illustrative embodiment.

This new set of search terms, which is the combination of search terms shown at both search term 1100 and required field 1102, is then entered as a new query into the associative memory. The associative memory may then return resource references 1106 (circle "3") as the result category, instead of returning the entity type or the perspective as the new result category. These resource references are used in the next step, as shown in FIG. 12. However, in an illustrative embodiment, this step does not need to be displayed to the user.

FIG. 12 is an illustration of using the resource references obtained as a result of the second query described in FIG. 11 to retrieve actual data from original sources, in accordance with an illustrative embodiment. FIG. 12 may represent a fifth step in a method of the illustrative embodiments. Thus, FIG. 12 is a continuation of the examples began in FIG. 1, FIG. 2, FIG. 9, FIG. 10, and FIG. 11. Like step 4 shown in FIG. 12, step 5 shown in FIG. 12 need not be displayed to the user.

Next, in this fifth step, the illustrative embodiments may use the resource references obtained in Step 4, such as resource references 1106 of FIG. 11, to retrieve the actual data from the original sources. These actual data may be, for example, data 1200 shown in FIG. 12. However, data may be retrieved for each resource shown in resource list 1202. This actual data will be used in the sixth and final step shown in FIG. 13.

FIG. 13 is an illustration of matching attribute values, excluding the required entity, as a result of performing the second query described in FIG. 11, demonstrating the actual context of the results, in accordance with an illustrative embodiment. FIG. 13 may represent a sixth step in a method of the illustrative embodiments. Thus, FIG. 13 is a continuation of the examples began in FIG. 1, FIG. 2, FIG. 9, FIG. 10, FIG. 11, and FIG. 12.

In the sixth step, the associative memory combines the entity information from step 3, shown in FIG. 10, with the actual data obtained in Step 5, shown in FIG. 12. The associative memory may display results 1300 to the user, as shown in FIG. 13.

In general, for each result, the associative memory may display matching terms 1302 (circle "1"), which may be considered attribute values. Where the matching attribute values were found, the associative memory may exclude the required entity, indicated by required field 1102 in FIG. 11. Likewise, where the matching attribute values were found, the associative memory may also exclude a portion of text from original source data, as shown at data 1304 (circle "2") relative to data 1200 shown in FIG. 12.

These values may be highlighted to draw attention to their context, as shown at highlighted text 1306 (circle "3"). This feature allows the user to quickly determine if the results are in the same context as their intent, or are out of context. In an illustrative embodiment, a user may identify a particular entity as being out of context by referring to a portion of source data, as shown by out-of-context entity 1308 (circle "4"). In addition, for each returned entity, a link may be provided to the actual resource, such as for example link 1310 (circle "5"). These links may allow a user to further investigate the source data relating to a particular entity of interest.

As can be seen, the illustrative embodiments shown in FIG. 13 allows a user to quickly determine which entities are in context relative to the user's original intent, and which entities are out of context relative to the user's intent. The number of out of context results may indicate to the user whether or not the user should modify the original search parameters in order to provide more results that are in context.

Figure 14:
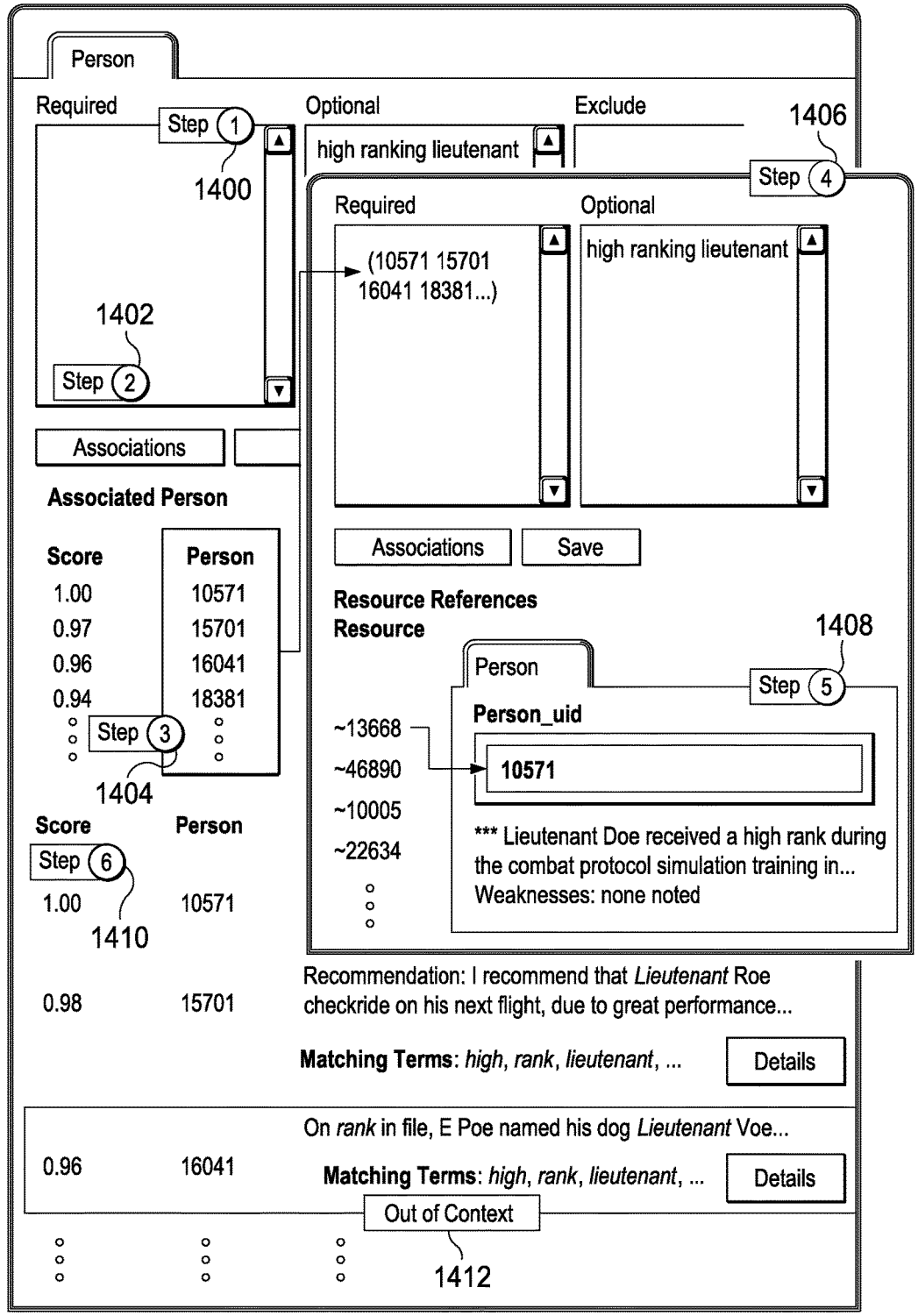
FIG. 14 is an overview illustration of a process of determining whether results of a search or query of an associative memory are in the same context as originally intended by a user, in accordance with an illustrative embodiment.

FIG. 14 is an overview illustration of a process of determining whether results of a search or query of an associative memory are in the same context as originally intended by a user, in accordance with an illustrative embodiment. FIG. 14 shows all six steps described with respect to FIG. 9 through FIG. 13, thereby providing a summary of the illustrative embodiments. The illustrative embodiments shown in FIG. 14 do not necessarily limit the claimed inventions.

Each circled number in FIG. 14 refers to one of the six steps. Step 1, shown at step 1400 (circle "1") may be to provide a user a mechanism to enter query terms into an associative memory, as also shown in FIG. 9. Step 2, shown at step 1402 (circle "2") may be to initiate the query, causing the associative memory to locate entities with attribute values that match the terms entered, as also shown in FIG. 9.

Step 3, shown at step 1404 (circle "3") may be to return an initial list of results with the result category equaling the perspective or entity type, as also shown in FIG. 10. Step 4, shown at step 1406 (circle "4") may be for the associative memory to use the results from step 1404 to perform the same query in step 1402, except that for this second query the list of one or more entity values from the results of step 1404 are added to the search terms. This list of entity values may be required to match on at least one of the returned entities. As a result, a list of resource references may be returned.

At step 5, shown at step 1408 (circle "5"), the associative memory may use the resource references obtained in step 1406 to retrieve actual data from original sources. Examples of such data are shown. At step 6, shown at 1410 (circle "6"), the associative memory may combine the entity information from step 3 1404 with the actual source data obtained in step 1408 and display the results to the user. This display of results and entities may allow the user to identify entities that are out of context with respect to the user's original intent, as shown by out-of-context example entity 1412.

The steps shown in FIG. 14 are not necessarily limiting of the illustrative embodiments. These steps may be varied, some steps may be omitted, or other steps may be added. For example, step 1 1400 may have already been provided and thus may be omitted from the process described above. Some steps need not be shown to the user, as described above.

The illustrative embodiments have several applications. For example, the illustrative embodiments may reduce time spent searching results of querying an associative memory that are out of context. The illustrative embodiments may highlight terms of associative memory queries in a vernacular that bring more understanding to the underlining intent of the user. The illustrative embodiments may allow a human resources employee to isolate job applicants who copy the entire job requisition into their resume in order to be selected for a specific position. The illustrative embodiments may allow employees to isolate suppliers who are using unsanctioned methods in order to win bid proposals. The illustrative embodiments may allow an analyst to identify the context behind enemy threats which would otherwise be difficult to locate. The illustrative embodiments have many other applications.

Figure 15:
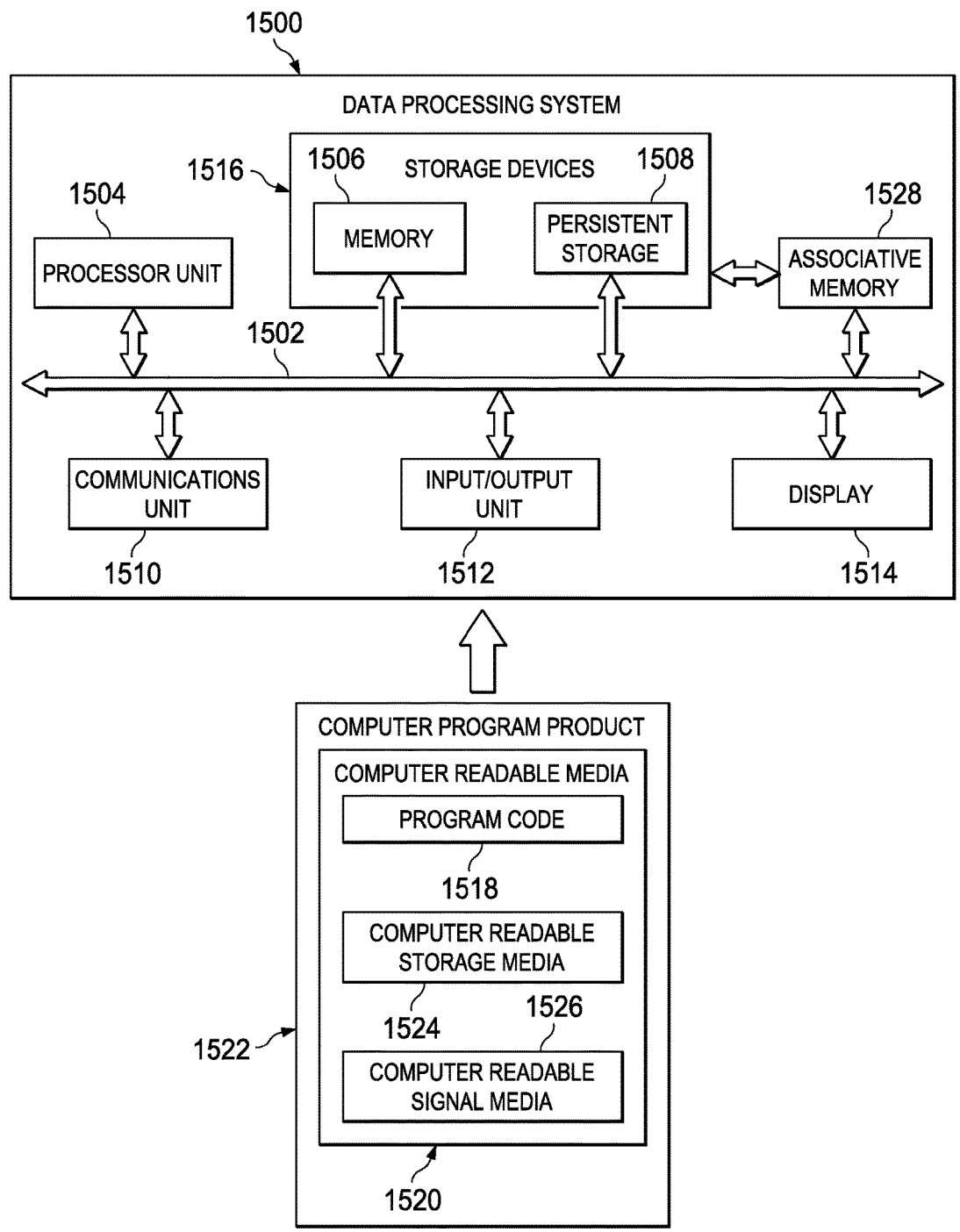
FIG. 15 is an illustration of a data processing system in accordance with an illustrative embodiment.

FIG. 15 is an illustration of a data processing system in accordance with an illustrative embodiment. Data processing system 1500 in FIG. 15 is an example of a data processing system that may be used to implement the illustrative embodiments, such as system 400 of FIG. 4, or any other module or system or process disclosed herein. In this illustrative example, data processing system 1500 includes communications fabric 1502, which provides communications between processor unit 1504, memory 1506, persistent storage 1508, communications unit 1510, input/output (I/O) unit 1512, and display 1514.

Processor unit 1504 serves to execute instructions for software that may be loaded into memory 1506. Processor unit 1504 may be a number of processors, a multi-processor core, or some other type of processor, depending on the particular implementation. A number, as used herein with reference to an item, means one or more items. Further, processor unit 1504 may be implemented using a number of heterogeneous processor systems in which a main processor is present with secondary processors on a single chip. As another illustrative example, processor unit 1504 may be a symmetric multi-processor system containing multiple processors of the same type.

Memory 1506 and persistent storage 1508 are examples of storage devices 1516. A storage device is any piece of hardware that is capable of storing information, such as, for example, without limitation, data, program code in functional form, and/or other suitable information either on a temporary basis and/or a permanent basis. Storage devices 1516 may also be referred to as computer readable storage devices in these examples. Memory 1506, in these examples, may be, for example, a random access memory or any other suitable volatile or non-volatile storage device. Persistent storage 1508 may take various forms, depending on the particular implementation.

For example, persistent storage 1508 may contain one or more components or devices. For example, persistent storage 1508 may be a hard drive, a flash memory, a rewritable optical disk, a rewritable magnetic tape, or some combination of the above. The media used by persistent storage 1508 also may be removable. For example, a removable hard drive may be used for persistent storage 1508.

Communications unit 1510, in these examples, provides for communications with other data processing systems or devices. In these examples, communications unit 1510 is a network interface card. Communications unit 1510 may provide communications through the use of either or both physical and wireless communications links.

Input/output (I/O) unit 1512 allows for input and output of data with other devices that may be connected to data processing system 1500. For example, input/output (I/O) unit 1512 may provide a connection for user input through a keyboard, a mouse, and/or some other suitable input device. Further, input/output (I/O) unit 1512 may send output to a printer. Display 1514 provides a mechanism to display information to a user.

Instructions for the operating system, applications, and/or programs may be located in storage devices 1516, which are in communication with processor unit 1504 through communications fabric 1502. In these illustrative examples, the instructions are in a functional form on persistent storage 1508. These instructions may be loaded into memory 1506 for execution by processor unit 1504. The processes of the different embodiments may be performed by processor unit 1504 using computer implemented instructions, which may be located in a memory, such as memory 1506.

These instructions are referred to as program code, computer usable program code, or computer readable program code that may be read and executed by a processor in processor unit 1504. The program code in the different embodiments may be embodied on different physical or computer readable storage media, such as memory 1506 or persistent storage 1508.

Program code 1518 is located in a functional form on computer readable media 1520 that is selectively removable and may be loaded onto or transferred to data processing system 1500 for execution by processor unit 1504. Program code 1518 and computer readable media 1520 form computer program product 1522 in these examples. In one example, computer readable media 1520 may be computer readable storage media 1524 or computer readable signal media 1526. Computer readable storage media 1524 may include, for example, an optical or magnetic disk that is inserted or placed into a drive or other device that is part of persistent storage 1508 for transfer onto a storage device, such as a hard drive, that is part of persistent storage 1508. Computer readable storage media 1524 also may take the form of a persistent storage, such as a hard drive, a thumb drive, or a flash memory, that is connected to data processing system 1500. In some instances, computer readable storage media 1524 may not be removable from data processing system 1500.

Alternatively, program code 1518 may be transferred to data processing system 1500 using computer readable signal media 1526. Computer readable signal media 1526 may be, for example, a propagated data signal containing program code 1518. For example, computer readable signal media 1526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1518 may be downloaded over a network to persistent storage 1508 from another device or data processing system through computer readable signal media 1526 for use within data processing system 1500. For instance, program code stored in a computer readable storage medium in a server data processing system may be downloaded over a network from the server to data processing system 1500. The data processing system providing program code 1518 may be a server computer, a client computer, or some other device capable of storing and transmitting program code 1518.

The different components illustrated for data processing system 1500 are not meant to provide architectural limitations to the manner in which different embodiments may be implemented. The different illustrative embodiments may be implemented in a data processing system including components in addition to or in place of those illustrated for data processing system 1500. Other components shown in FIG. 15 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1504 may take the form of a hardware unit that has circuits that are manufactured or configured for a particular use. This type of hardware may perform operations without needing program code to be loaded into a memory from a storage device to be configured to perform the operations.

For example, when processor unit 1504 takes the form of a hardware unit, processor unit 1504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1518 may be omitted because the processes for the different embodiments are implemented in a hardware unit.

In still another illustrative example, processor unit 1504 may be implemented using a combination of processors found in computers and hardware units. Processor unit 1504 may have a number of hardware units and a number of processors that are configured to run program code 1518. With this depicted example, some of the processes may be implemented in the number of hardware units, while other processes may be implemented in the number of processors.

As another example, a storage device in data processing system 1500 is any hardware apparatus that may store data. Memory 1506, persistent storage 1508, and computer readable media 1520 are examples of storage devices in a tangible form.

In another example, a bus system may be used to implement communications fabric 1502 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1506, or a cache, such as found in an interface and memory controller hub that may be present in communications fabric 1502.

Data processing system 1500 may also include associative memory 1528. Associative memory 1528 may be associative memory 402 of FIG. 4, and may have the properties described elsewhere herein. Associative memory 1528 may be in communication with communications fabric 1502. Associative memory 1528 may also be in communication with, or in some illustrative embodiments, be considered part of storage devices 1516. While one associative memory 1528 is shown, additional associative memories may be present.

The different illustrative embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer configured to improve information retrieval from a memory, the system comprising:
    an associative memory comprising a non-transitory computer readable storage medium storing data and a plurality of associations among the data, wherein the data is collected into associated groups, wherein the associative memory is configured to be queried based on at least indirect relationships among the data, wherein the associative memory is logically divided by a user into perspectives, wherein a perspective represents an entity type and provides a context for a particular aspect of a domain, and wherein the associative memory is configured to use a particular perspective within the perspectives to distinguish one context from another; and
    a non-transitory input device, in communication with the associative memory, configured to receive a first comparison request from the user, wherein the first comparison request takes place within a specified perspective that matches an entity type sought by the user;
    the associative memory configured to:
        responsive to receiving the first comparison request, locate an entity value having an attribute value matching a term of the first comparison request according to the specified perspective, wherein the comparison includes structured and unstructured data, and wherein unstructured data comprises free text without predefined structure organized by categories;
        parsing the unstructured data to define a structure for the unstructured data;
        responsive to locating the entity value, return a first list of results including the entity value;
        add, as a required search term, at least one of first results from the first list of results to a second comparison request, the second comparison request further including all terms of the first comparison request;
        perform the second comparison request and, as a result, return a second list of resource references;
        use the second list to retrieve source data;
        combine the entity value with the source data to form a combination; and
        return the combination to form a returned combination, wherein the returned combination includes matching terms and a portion of source data in which the matching terms occur for determining whether the returned combination is in context with the first comparison request according to the specified perspective.

2. The system of claim 1, wherein the associative memory initiates the second comparison request in response to the input device receiving the first comparison request.

3. The system of claim 1, wherein the associative memory is further configured to avoid presenting the first list to a user.

4. The system of claim 1, wherein the associative memory is further configured to require a match on the entity value.

5. The system of claim 1, wherein the associative memory is configured to return the second list instead of returning an entity type or perspective as a result category.

6. The system of claim 1, wherein the source data is from an original source.

7. The system of claim 6, wherein associative memory is further configured to avoid presenting the source data to the user.

8. The system of claim 1, further comprising a display device in communication with the associative memory, the associative memory further configured to cause the display device to display the combination.

9. The system of claim 8, wherein the associative memory is further configured to cause the display device to further display the attribute value that matches the term of the first comparison request, and also to display a portion of text from the source data.

10. The system of claim 9, wherein the associative memory is further configured to cause the entity value to be excluded from display.

11. A method in a computer, the method being for improving information retrieval from a memory, the memory being an associative memory comprising data and a plurality of associations among the data, wherein the data is collected into associated groups, wherein the associative memory is configured to be queried based on at least indirect relationships among the data, wherein the associative memory is logically divided into perspectives by a user, wherein a perspective represents an entity type and provides a context for a particular aspect of a domain, and wherein the associative memory is configured to use a particular perspective within the perspectives to distinguish one context from another, the method comprising:
receiving a first comparison request from the user, wherein the first comparison request takes place within a specified perspective that matches an entity type sought by the user;
responsive to receiving the first comparison request, locating an entity value having an attribute value matching a term of the first comparison request according to the specified perspective, wherein the comparison includes structured and unstructured data, and wherein unstructured data comprises free text without predefined structure organized by categories;
parsing the unstructured data to define a structure for the unstructured data;
responsive to locating the entity value, returning a first list of results including the entity value;
adding, as a required search term, at least one of first results from the first list of results to a second comparison request, the second comparison request further including all terms of the first comparison request;
performing the second comparison request and, as a result, returning a second list of resource references;
using the second list to retrieve source data;
combining the entity value with the source data to form a combination; and
returning the combination to form a returned combination, wherein the returned combination includes matching terms and a portion of source data in which the matching terms occur for determining whether the returned combination in context with the first comparison request according to the specified perspective.

12. The method of claim 11 further comprising:
displaying the combination on a display, while avoiding presentation of the first list to a user.

13. The method of claim 11 further comprising:
returning the second list instead of returning an entity type or perspective as a result category.

14. The method of claim 11 further comprising:
displaying, on a display, the combination;
displaying, on the display, the attribute value that matches the term of the first comparison request; and
displaying, on the display, a portion of text from the source data.

15. A data processing system configured to improve information retrieval from a memory, the data processing system comprising:
a processor;
a bus in communication with the processor;
a memory in communication with the bus;
an associative memory stored in the memory, the associative memory comprising data and a plurality of associations among the data, wherein the data is collected into associated groups, wherein the associative memory is configured to be queried based on at least indirect relationships among the data, wherein the associative memory is logically divided into perspectives by a user, wherein a perspective represents an entity type and provides a context for a particular aspect of a domain, and wherein the associative memory is configured to use a particular perspective within the perspectives distinguish one context from another; and
the memory also storing computer usable program code comprising:
computer usable program code for receiving a first comparison request for the associative memory from the user, wherein the first comparison request takes place within a specified perspective that matches an entity type sought by the user;
computer usable program code for, responsive to receiving the first comparison request, locating an entity value in the associative memory according to the specified perspective, the entity value having an attribute value matching a term of the first comparison request, wherein the comparison includes structured and unstructured data, and wherein unstructured data comprises free text without predefined structure organized by categories;
computer usable code for parsing the unstructured data to define a structure for the unstructured data;
computer usable program code for, responsive to locating the entity value, causing the associative memory return a first list of results including the entity value;
computer usable program code for adding, as a required search term, at least one of first results from the first list of results to a second comparison request, the second comparison request further including all terms of the first comparison request;
computer usable program code for performing the second comparison request in the associative memory and, as a result, returning a second list of resource references comprising pointers to structured and unstructured source data;

computer usable program code for using the second list to retrieve source data, wherein the associative memory uses external parsers and extractors to define a structure for unstructured source data;

computer usable program code for combining the entity value with the source data to form a combination; and computer usable program code for returning the combination to form a returned combination, wherein the returned combination includes matching terms and a portion of source data in which the matching terms occur for determining whether the returned combination is in context with the first comparison request according to the specified perspective.

16. The data processing system of claim 15, wherein the memory also stores computer usable program code for displaying the combination on a display, while avoiding presentation of the first list to a user.

17. The data processing system of claim 15, wherein the memory also stores computer usable program code for returning the second list instead of returning an entity type or perspective as a result category.

18. The data processing system of claim 15, wherein the memory also stores:

computer usable program code for displaying, on a display, the combination;

computer usable program code for displaying, on the display, the attribute value that matches the term of the first comparison request; and computer usable program code for displaying, on the display, a portion of text from the source data.

* * * * *